F. VIELBERTH.
ROLLER BEARING.
APPLICATION FILED APR. 7, 1913.
1,109,490.
Patented Sept. 1, 1914.
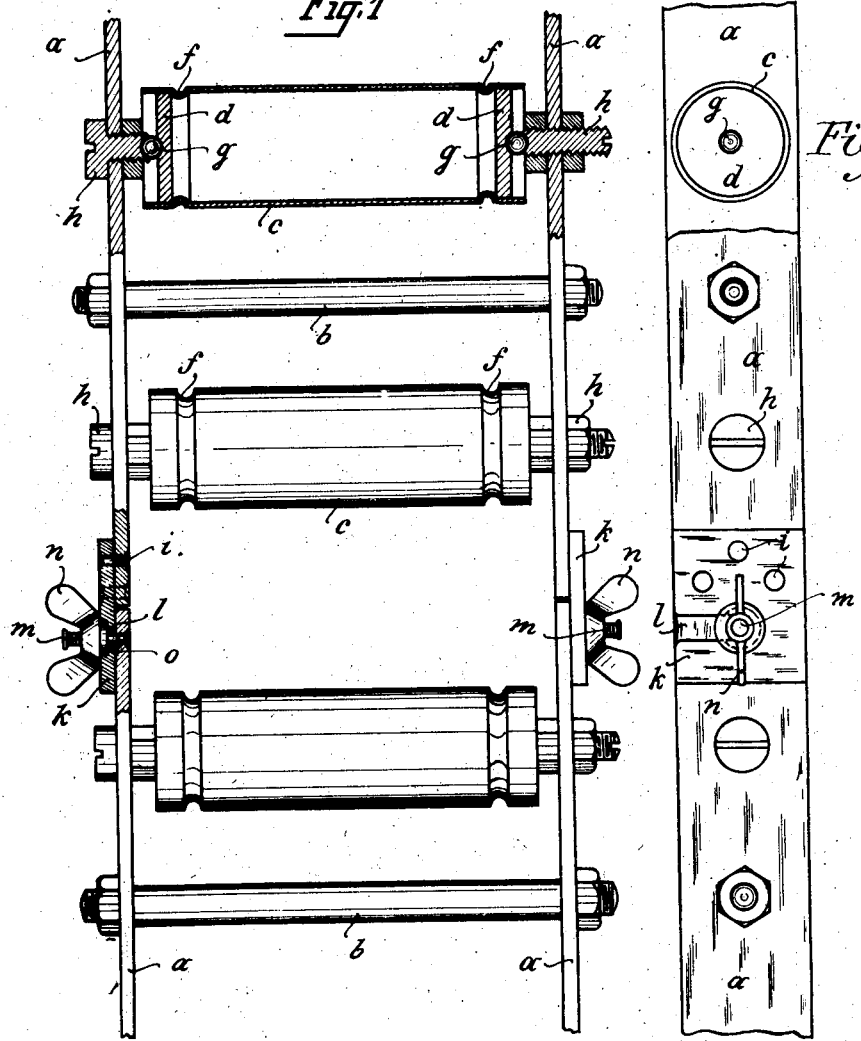
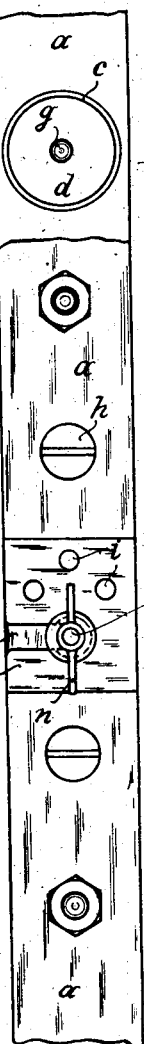
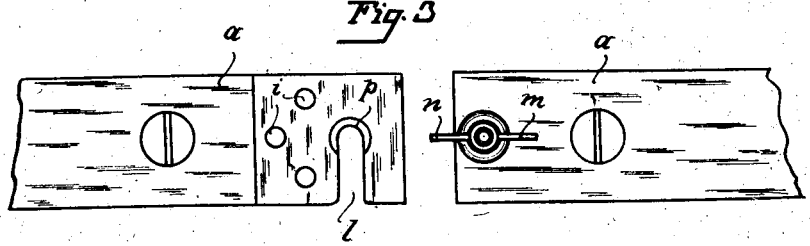
Witnesses:
Inventor:

UNITED STATES PATENT OFFICE.

FRANZ VIELBERTH, OF NUREMBERG, GERMANY.

ROLLER-BEARING.

1,109,490.　　　Specification of Letters Patent.　　Patented Sept. 1, 1914.

Application filed April 7, 1913. Serial No. 759,479.

*To all whom it may concern:*

Be it known that I, FRANZ VIELBERTH, a citizen of the Empire of Germany, and a resident of Sigmundstrasse 6, Nuremberg, in the Kingdom of Bavaria, Germany, have invented certain new and useful Improvements in Roller-Bearings, of which the following is a specification.

This invention has for its object to provide an improved brick carrier, of the kind consisting of a frame with rotating steel tube rollers.

According to this invention disks or end plates are inserted in both ends of the rollers wherein they are fixed by means of an annular groove in the rollers and are mounted each on a ball situated in a recess formed in both the end disk and a set screw. By means of this arrangement the bearing surfaces can be easily and readily renewed when worn.

The invention also consists in providing a disconnectible connection of the several frames in such a manner that the two side members which are to be connected together are made to abut against each other and a projecting strap is fixed on one side member, in such a manner that it engages by means of a slot over a bolt fixed to the other side member and is held firmly by means of a thumb nut screwing on the said bolt.

A construction of a chute for bricks constructed according to this invention is illustrated by way of example in the accompanying drawings, in which:—

Figures 1 and 2 are respectively a plan and a side view of the improved chute. Fig. 3 is a side view of the side members disconnected from each other.

As shown, the brick chute is composed of the two side members $a$ which are connected by bolts $b$ so as to form a fixed frame. The rollers $c$ are made of drawn steel tubing in both ends of which disks $d$ are inserted which are held in place by annular grooves $f$. The rollers are supported each by means of a ball $g$ at each end. Each ball rests in a recess in the side of the disk $d$ on one side and on the other side in a recess in a set screw $h$, so that it can be readily removed and replaced. The set screws $h$ are mounted in a movable and adjustable manner in the frame $a$. This simple ball bearing for the rollers effects an extremely easy guidance of the rollers and allows of readily renewing the bearing after the balls have become worn. The frames $a$ which are about from 1 to 2 meters long are connected together in twos or more according to the length of the chute run, at the place of building, and are taken apart for transport.

For the purpose of connecting the frame parts together straps $k$ are fixed by means of rivets $i$ to one end of the side members $a$, and these straps engage by means of a slot $l$ each over a bolt $m$ fixed to the other side member. On the bolt $m$ is a ringnut $n$ provided on its underside with a shoulder or extension $o$ engaging in a circular part $p$ of the slot $l$, whereby the strap can be undone only after the nut has been completely screwed back. This arrangement prevents a separation of the single parts of the frame during the operation of the device. The frames are connected together by passing the bolts $m$ of one frame into the slots $l$ of the straps of the other frame and then screwing the nuts up, whereby the ends of the side members abut against each other and prevent the formation of a kink or angle.

Having now particularly described and ascertained the nature of my said invention and in what manner the same is to be performed, I declare that what I claim is:—

Ball bearing of the character described comprising in combination a carrier for said bearing provided with annular grooves intermediate its ends, disks endwise inserted into said carrier provided with recesses in their outer faces, a ball resting in the recess of each disk, set screws passing laterally through said carrier each provided with a cavity at the inner end constituting with the recess of each disk a bearing for said ball for pressing the disk in opposite directions against the outer walls of said grooves, substantially as described.

Signed by me at Nuremberg, Germany, this twenty-sixth day of March, 1913.

FRANZ VIELBERTH.

Witnesses:
　A. HEERLEI,
　OSCAR BOCK.